United States Patent
Rowland et al.

(10) Patent No.: US 9,493,633 B2
(45) Date of Patent: Nov. 15, 2016

(54) PERFORMANCE MODIFIERS FOR BITUMEN COMPRISING STRAIGHT AND BRANCHED CHAIN FATTY AMIDE WAXES

(71) Applicant: Akzo Nobel Chemicals International B.V., Amersfoort (NL)

(72) Inventors: John M. Rowland, Huissen (NL); Ralph Franklin, Danbury, CT (US); Stephanie Hogendoorn, Brookfield, CT (US)

(73) Assignee: AKZO NOBEL CHEMICALS INTERNATIONAL B.V., Amersfoort (NL)

(*) Notice: Subject to any disclaimer, the term of this patent is extended or adjusted under 35 U.S.C. 154(b) by 0 days.

(21) Appl. No.: 14/771,661

(22) PCT Filed: Mar. 11, 2014

(86) PCT No.: PCT/EP2014/054627
§ 371 (c)(1),
(2) Date: Aug. 31, 2015

(87) PCT Pub. No.: WO2014/139974
PCT Pub. Date: Sep. 18, 2014

(65) Prior Publication Data
US 2016/0002442 A1    Jan. 7, 2016

Related U.S. Application Data

(60) Provisional application No. 61/782,806, filed on Mar. 14, 2013.

(30) Foreign Application Priority Data

Jul. 4, 2013  (EP) .................................. 13175050

(51) Int. Cl.
  *C08K 5/20*   (2006.01)
  *C08L 95/00*  (2006.01)
(52) U.S. Cl.
  CPC .................. *C08K 5/20* (2013.01); *C08L 95/00* (2013.01); *C08L 95/005* (2013.01); *C08L 2205/02* (2013.01); *C08L 2555/64* (2013.01)
(58) Field of Classification Search
  CPC ........ C08L 95/00; C08L 51/00; C08L 59/00; C08L 23/00; C09D 195/00; C10C 3/00; C08K 5/00; C08K 5/0008; D06N 5/00; C08J 2395/00
  See application file for complete search history.

(56) References Cited

U.S. PATENT DOCUMENTS

2009/0137705 A1* 5/2009 Faucon Dumont ..... C04B 26/26
                                                             524/71
2010/0319577 A1* 12/2010 Naidoo .................... C08K 5/16
                                                            106/235

(Continued)

FOREIGN PATENT DOCUMENTS

FR          070041 A1    1/2007
WO      2005/087869 A1    9/2005

OTHER PUBLICATIONS

Espacenet Machine Translation of FR 2 911 611.*

(Continued)

*Primary Examiner* — Kaj K Olsen
*Assistant Examiner* — Alexandra M Moore
(74) *Attorney, Agent, or Firm* — Nirav P. Patel

(57) ABSTRACT

The present invention generally relates to the discovery that a blend of linear and branched amide wax additives can be used to enhance the performance of asphalt binders and asphalt emulsion residues. In particular, high temperature properties of asphalt pavement can be improved while maintaining or improving low temperature properties. The additives also improve workability and lower processing temperatures for asphalt paving (e.g. warm mix) or for roofing. These amide wax additives can reduce the tracking of tack coats, by decreasing binder penetration and forming a non-tacky surface layer.

20 Claims, 2 Drawing Sheets

(56) References Cited

U.S. PATENT DOCUMENTS

2011/0197785 A1* 8/2011 Trumbore ............... C08L 95/00
106/270
2012/0214912 A1* 8/2012 Harders ................... C08K 5/20
524/71

OTHER PUBLICATIONS

European Search Report for EP 13175050.7 dated Nov. 27, 2013.
International Search Report and Written Opinion for PCT/EP2014/054627, date of mailing May 19, 2014.

* cited by examiner

US 9,493,633 B2

PERFORMANCE MODIFIERS FOR BITUMEN COMPRISING STRAIGHT AND BRANCHED CHAIN FATTY AMIDE WAXES

This application is a national stage filing under 35 U.S.C. §371 of PCT/EP2014/054627, filed Mar. 11, 2014, which claims priority to U.S. Provisional Patent Application No. 61/782,806 filed Mar. 14, 2013, and European Patent Application No. 13175050.7, filed Jul. 4, 2013, the contents of which are each incorporated herein by reference in their entireties.

FIELD OF THE INVENTION

The present invention relates to mixtures of reaction products and reaction products of mixtures of long-chain fatty acids and (alpha, omega) alkylene diamines and their use as performance modifiers for bitumen and in asphalt emulsions. Further, the present invention relates to a composition comprising asphalt cement and the reaction products of long-chain fatty acids and alkylene diamines. Conversely, one could achieve the present invention with reaction products of long-chain fatty amines and alkylene diacids.

BACKGROUND OF THE INVENTION

Asphalt roadways are constructed from mixtures of asphalt cement (bitumen) and aggregate. Over time, the road suffers damage due to traffic and/or environmental factors and some of this damage can be related to the properties of the asphalt cement. For example, rutting from heavy vehicle traffic is often a result from too soft asphalt binder at high temperatures and cracking can be a result of too high asphalt binder stiffness at low temperatures. Due to the increase in road traffic, the high costs of repair and replacement, and the decline in asphalt cement quality, the modification of the high and low temperature properties of asphalt cement (bitumen) by means of additives is often necessary to improve the durability of the road.

In the following, the terms asphalt and bitumen are used to describe natural or petroleum-derived bitumen including the well-known penetration grade bitumen, blown or oxidized grades and polymer-modified bitumen, for example, modified with styrene-butadiene polymers or ethylene vinyl acetate polymers or ground tire rubber. The terms asphalt and bitumen are also considered to include asphalts as described above which may be modified with chemical additives such as adhesion promoters, polyphosphoric acid, or sulfur.

Road construction and repair materials are most commonly prepared by heating asphalt cement to a fluid state and mixing directly with heated aggregate forming "hot mix" which is placed onto the roadway and compacted while still hot. Alternatively the asphalt cement may be fluidified by dilution with solvents, or emulsified with water and emulsifier and mixed with aggregates to provide materials that can be used at lower temperatures. In other techniques fluidified asphalt is sprayed onto the road surface.

Harder, higher viscosity asphalts mostly find application in the roofing industry, but also in some special paving applications such as bond coats. High viscosity asphalts can be prepared by air-blowing ("oxidation") of soft asphalts, by solvent deasphalting processes at the refinery or by the use of natural asphalts like Gilsonite®. Changes in refinery processes have limited the availability and raised the cost of hard asphalts in some regions.

Asphalt cement can be characterized by its consistency at different temperatures and viscosity measurements are used to classify asphalts into different grades suitable for different applications and climates. Several different rheological tests or combinations of tests may be used to classify asphalt cement. Penetration value is used to measure hardness—the harder the material, the smaller the penetration value. Softening point is the temperature at which the asphalt cement begins to flow freely, and is particularly used for air-blown asphalts.

For hot mix paving applications, the Strategic Highway Research Program (SHRP) has developed asphalt binder specifications, including high temperature tests and low temperature tests, performed on asphalt cement before and after accelerated ageing. The high temperature tests determine the viscoelastic characteristics of the asphalt to control pavement rutting. The low temperature tests determine the cold flow properties of the asphalt to control low temperature cracking. The oven aging tests predict aging characteristics to estimate binder properties after extended periods of time on the road. SHRP binder grades have the form PG XX-YY, where XX is the maximum pavement temperature in degrees Celsius and -YY is the minimum pavement temperature in degrees Celsius. For instance, a binder grade of PG 64-28 means that the binder gives acceptable performance in the temperature range from $-28°$ C. to $64°$ C. at normal traffic loads. As such, this system defines climate-related optimal working conditions of asphalt binder through specifications for high and low temperature properties of asphalt cement that correlate to road performance. An increase in the upper performance grade of asphalt helps a road resist rutting, while an improved lower performance grade helps a road resist thermal cracking.

The viscosity of the asphalt cement at high temperatures needed for the production and paving of the hot mix is another important parameter measured in the PG grading system. More viscous binders require higher processing, paving and compaction temperatures.

Conventional bitumen compositions frequently cannot meet all of the requirements of a particular specification simultaneously and, if these specifications are not met, damage to the resulting road can occur, including permanent deformation, thermally induced cracking and flexural fatigue. This damage greatly reduces the effective life of paved roads.

To meet performance needs with asphalt cement, performance modifying additives are used. Asphalt cement is modified using polymer modifiers such as styrene-butadiene-styrene (SBS), polyethylene (PE) or other polymers, using wax-type compounds such as montan wax, Fischer-Tropsch wax, amide waxes or using inorganic modifiers such as hydrated carbonate rock.

Polymer modifiers, such as SBS, can improve both the high temperature and low temperature PG grades. However, in addition to being quite difficult to manufacture, involving high shear mixing, polymer-modified binders also have high viscosity and require higher mix and paving temperatures.

High melting point waxes, such as Fischer-Tropsch, paraffin and montan waxes, also stiffen asphalt cement. They are more easily incorporated into asphalt than polymer modifiers, and often reduce the high temperature viscosity and thus allow lower asphalt production and paving temperatures. However, these additives also reduce low temperature flexibility (raise the lower PG grade) and may lead to cracking during cold weather.

High melting point amide waxes can be formed by the reaction of long-chain fatty acids and alkylene diamines, or reaction of long-chain fatty amines and alkylene diacids. These fatty amide waxes, such as ethylenediamine bisstearamide (EBS), have a similar effect in asphalt cement as the petroleum derived waxes but, depending on the source of the fatty acids, offer the potential to have the advantage of coming from primarily renewable raw materials.

Like some of the petroleum waxes, at hot mix production and paving temperatures addition of EBS into asphalt cement reduces the viscosity of the resulting modified asphalt binder. This allows a reduction in mix and paving temperatures compared to unmodified asphalt cement, leading to a consequent reduction in the production of fumes and vapor.

As the mixture cools, the viscosity increases above that of the unmodified asphalt cement and the resulting asphalt-aggregate pavement can sustain heavy loads. Amide waxes can thus be used to suppress rut formation even in hot climates where rutting is common, increasing the life of the asphalt pavement. This has an additional advantage of allowing the use of softer asphalt cement.

A disadvantage of traditional amide waxes is that in common with the petroleum and coal derived waxes, the low temperature flexibility of the modified asphalt binders is decreased compared to unmodified or polymer-modified asphalt binder, reducing their cold weather capability. In terms of the PG grading system described above, the lower PG grade is increased.

Methods used to combat the decrease in low temperature flexibility of paraffin waxes include addition of a vegetable wax, based on modified palm wax esterified with stearic acid, to Fischer-Tropsch wax), and incorporation of isomerized Fischer-Tropsch paraffin waxes.

Ethylene bisstearamide is an example of an amide wax that has been used widely in asphaltic pavements. Use of ethylene bisstearamide to reduce the viscosity of asphalt and increase softening point has been known at least since 1974. Ethylene bisstearamide, used in conjunction with animal wax such as Shellac, has been reported to reduce the temperature needed for placement of asphalt pavement. The product may also be used other asphalt applications outside of hot mix including sprayed asphalt applications, roofing and adhesives.

Methods used to combat the decrease in low temperature flexibility of EBS amide waxes include increasing the amount of the shorter alkyl chain palmitic acid vs. the longer chain stearic acid, especially with incorporation of 1 part in 20 of a dicarboxylic acid, which was found to improve the low temperature properties.

It is therefore an object of the present invention to provide a modifier for asphalt cement which improves rutting and processing characteristics of asphalt pavement without compromising the low-temperature properties of the asphalt cement. Such modified binders would have utility in applications including a compaction aid and performance grade booster for hot mix asphalt, a viscosity reducer for warm mix asphalt, a process aid for asphalt mastics, and as a binder stiffener for trackless tacks, primes and fog seals (either hot applied or using emulsion) or roofing applications. Thin surface treatments such as chipseals, slurry seals, microsurfacing and the like may also benefit from the properties imparted to the asphalt cement of lower temperature susceptibility combined with good low temperature properties.

While most of the discussion has centered on hot and warm mix paving applications, asphalt binders incorporating the present invention would also have utility in emulsions and in non-paving applications. Some examples of non-paving applications are in protective coatings for metal articles, binders for construction boards, waterproofing compositions, asphalt sealcoats for parking lots and driveways, binders for fuel pellets and briquettes, and in roofing materials.

Another object of the invention is to provide an additive which can be obtained from primarily renewable sources.

A third object is to provide an additive which increases the softening point and decreases the penetration value of asphalt binder.

BRIEF DESCRIPTION OF THE DRAWINGS

The following description of the invention may be more readily understood by reference to the Figures, wherein.

SUMMARY OF THE INVENTION

Figure 1:
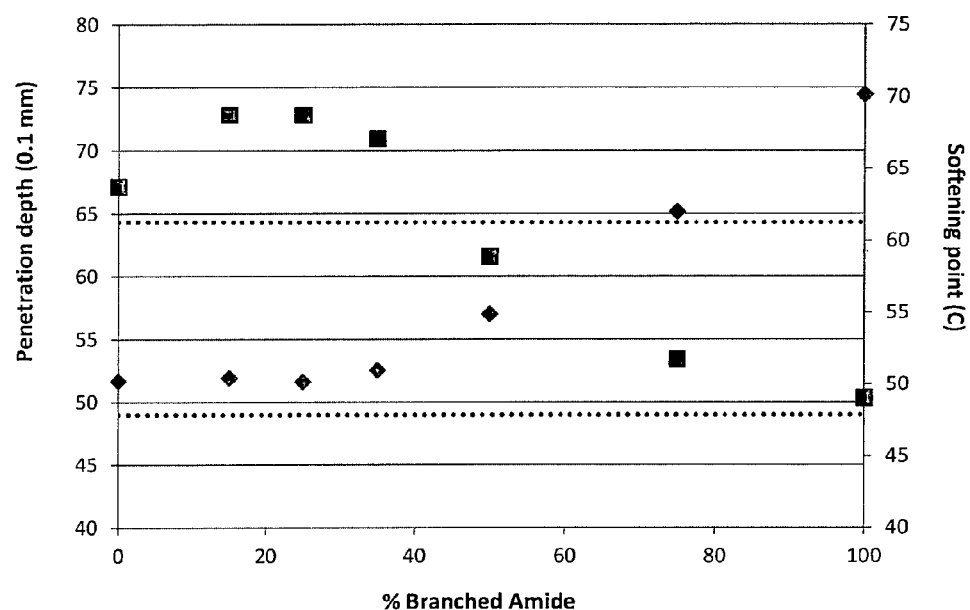
FIG. 1 illustrates the results on penetration and softening point of different compositions of blends of branched amides and linear amides, as a percentage of branched amides in the blends.

The present invention generally relates to the discovery that a blend of linear and branched amide wax additives can be used to enhance the performance of asphalt binders and asphalt emulsion residues. In particular, high temperature properties of asphalt pavement can be improved while maintaining or improving low temperature properties. The additives also improve workability and lower processing temperatures for asphalt paving (e.g. hot and warm mix) or for roofing. These amide wax additives can reduce the tracking of tack coats, primes and fog seals, by decreasing binder penetration and forming a non-tacky surface layer.

The state of the art in high and low temperature improvement of asphalt pavement is the use of polymer modification, but polymer modification generally demands higher mix and paving temperatures. The state of the art in asphalt workability and production temperature lowering is the use of rheology-modifying additives such as Fischer-Tropsch or amide waxes. While improving the high temperature properties of the asphalt cement these additives negatively impact the low temperature properties. The state of the art in reduction of tracking in tack coat, prime coat and fog seal is the use of low penetration asphalt binders and asphalt modifiers that lower penetration. Low penetration asphalt binders are more expensive and have limited availability. Use of an additive to stiffen the binder to reduce penetration chemically seemed desirable.

The use of linear and branched amide wax additives leads to improvements in both the high and low temperature properties of asphalt cements, as well as increased workability and lower production temperatures for hot mix made with those cements—state of the art methods can only achieve one or the other. It is possible to prepare the amide wax components from renewable fatty acids. While not wishing to be tied to a particular mechanism of action, branching in the fatty portion of the amide waxes may reduce the crystallinity of the modified asphalt binder, whereas the conventional straight chain fatty amides increase the crystallinity.

DETAILED DESCRIPTION OF THE INVENTION

The present invention generally relates to the use of mixtures of linear and branched fatty alkyl amide waxes to enhance both high and low temperature properties of asphalt binders. Use of these additives will improve road durability in climates that see both hot and cold seasonal temperatures. Some examples will also lower temperature for paving, allowing its use in so-called warm mix asphalt (WMA) applications. The products of this invention can also be used as a compaction aid for hot mix asphalt applications and as a process aid for asphalt mastics without adverse effects on the low temperature flexibility of the asphalt binder. In spray applications like tack, prime and fog seals, the products provide non tracking character while providing improved lower temperature properties compared to other wax additives.

Compared to polymer modification, the products of the invention are easier to incorporate into the asphalt binder and the hot mixes formed from the modified binders can be manufactured, placed and compacted at lower temperatures. With the appropriate selection of raw materials, the products of the invention can be derived predominantly from renewable raw materials.

The invention offers an advantage over linear paraffin or amide wax additives in terms of retention of low temperature flexibility. It was found that amides based on ethylenediamine and mixtures of linear and branched fatty acids were effective in increasing upper temperature binder properties while maintaining, or improving, lower temperature properties.

Surprisingly, certain combinations of linear and branched amides provided a performance boost in excess of that predicted by simple additive effects. Thus, it was possible to modify an asphalt cement from an original grade of PG64-16 binder to PG76-16 by using amides based largely on renewable materials and without the use of synthetic waxes or polymer modifiers.

It was also found that certain combinations of linear and branched fatty amides provided increases in the softening point and decreases in the penetration depth of asphalt binder in excess of that predicted by simple additive effects.

Ethylene bisstearamide has been successfully used in asphalt in conjunction with elastomers such as SBS. It has been used with the elastomer polybutadiene and a monoalkyl ester of vegetable or animal oil. In synthetic binder compositions designed to incorporate pigment, EBS can be used in conjunction with elastomers such as SBS to lower the workability temperature. The additives of the current invention should be equally compatible with elastomers such as SBS. Use of EBS in blown asphalt has also been disclosed, and additives of the current invention should be equally compatible with this process.

This invention also allows the use of a predominantly renewable additive to reduce tracking of tack coat, by modifying penetration and softening point and by formation of a non-tracking film from the surface-migrating amide additive. Binders incorporating these amides can be heated for use in hot applied tack coat operations, or can be emulsified for use in more traditional tack coat applications.

The invention is applicable to any natural and petroleum-derived asphalts including straight-run fractional-derived asphalts, cracked asphalts, asphalts derived from processing such as blown asphalts, propane deasphalting, steam distillation, polymer-modified asphalts, chemically modified asphalts and the like as well as asphalts partly derived from mineral asphalts such as Gilsonite or Trinidad Lake Asphalt.

A first aspect of the present invention relates to the use of fatty bisamide waxes which are obtainable by the condensation of branched and/or linear fatty acids and alkylene diamines. The ratio of long-chain fatty acids to alkylene diamines is generally in the range of 2 to 1.

An asphalt mixture can be formed having aggregate and from 2% to 20% of a bitumen composition of the present invention. It is envisaged that mixtures prepared by hot, warm or cold techniques, including asphalt emulsion mixes could benefit from the invention, since in all cases the ability to control both high and low temperatures properties is an advantage. The products of the invention can also be applied to mastic asphalt and asphalt materials used in non paving applications. They can also be used in asphalt emulsions. Typical asphalt emulsions employ 20-80% by weight performance modifier; in another embodiment 30-75% by weight performance modifier and in yet another embodiment 40-70% by weight performance modifier.

The linear long-chain fatty acids preferably comprise C12-C22 fatty acids, saturated or unsaturated, optionally substituted. Typical examples are caproic acid, caprylic acid, 2-ethyl hexanoic acid, capric acid, lauric acid, isotridecanoic acid, myristic acid, palmitic acid, palmitoleic acid, stearic acid, isostearic acid, oleic acid, elaidic acid, petroselic acid, linoleic acid, linolenic acid, elaeostearic acid, arachic acid, gadoleic acid, behenic acid and erucic acid and the technical mixtures thereof obtained, for example, in the pressure hydrolysis of natural fats and oils, in the reduction of aldehydes from Roelen's oxosynthesis or in the dimerization of unsaturated fatty acids. Technical fatty acids containing 12 to 18 carbon atoms, for example, coconut oil, palm oil, palm kernel oil or tallow fatty acids, preferably in hydrogenated or partially hydrogenated form, are preferred. Also preferred are unsaturated fatty acids like oleic acid, erucic acid or monomer acids.

The linear long-chain fatty acid in the performance modifier according to the present invention is predominantly linear. For the purpose of the present invention, "predominantly linear" means that the fatty acid comprises >90% linear alkyl and/or alkenyl groups; particularly, >95% linear alkyl and/or alkenyl groups; more particularly, >99% linear alkyl and/or alkenyl groups.

Fatty acids of the current invention include stearic acid having preferably >60% fatty tails with 18 or more carbon atoms, including stearic acid derived from hardened tallow, hardened rapeseed, hardened erucic acid, and behenic acid.

The branched long-chain fatty acids preferably comprise C12-C22 fatty acids, saturated or unsaturated, optionally substituted, that are at least 40%, in another embodiment at least 50%, in another embodiment 60-100% alkyl branched, in another embodiment methyl branched.

The alkylene diamines preferably comprise diamines of the structure

where n=2-6.

In a first embodiment the fatty bisamide wax is a physical blend of two waxes, the first of the structure

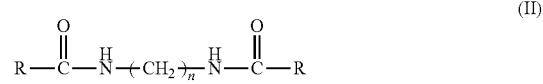

where R is a long-chain predominantly linear alkyl group having from 11, in another embodiment from 17, to 23, in still another embodiment 17 to 21 carbon atoms, unsaturated or saturated, optionally substituted, and the second of the structure

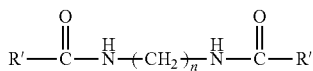

(III)

where R' is a long-chain alkyl group having from 11, in another embodiment from 17, to 23, in another embodiment to 21 carbon atoms, unsaturated or saturated, optionally substituted, with alkyl branching, in another embodiment methyl branching, occurring on at least 40%, in another embodiment 60-100% of the R' groups. The proportion of the second wax in the physical mixture is from 15%, in another embodiment from 20%, to 75%, in another embodiment from about 20% to 40%. 5-50% of the alkyl groups of the blend of the two waxes are branched; in another embodiment, 10-40% of the alkyl groups of the blend of the two waxes are branched; in yet another embodiment, 10-30% of the alkyl groups of the blend of the two waxes are branched.

In a second embodiment the fatty bisamide wax is obtained by condensation of a mixture of predominantly linear fatty acid and branched fatty acid of the types previously defined with alkylene diamines as of the types previously defined. The proportion of branched fatty acid in the acid mixture is from 15%, in another embodiment from 20%, to 75%, in another embodiment from about 20% to 40%. The resulting bisamide wax will comprise a mixture of structures II and III above, also including the structure

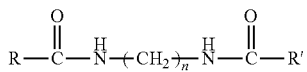

(IV)

where R is a long-chain alkyl group having from 11, in another embodiment from 17, to 23, in another embodiment from 17 to 21 carbon atoms, unsaturated or saturated, optionally substituted, and where R' is a long-chain alkyl group having from 11, in another embodiment from 17, to 23, in another embodiment to 21 carbon atoms, unsaturated or saturated, optionally substituted, with alkyl branching, in another embodiment methyl branching, occurring on at least 40%, in another embodiment 60-100% of the R' groups. The performance modifier of the invention can comprise the bisamide wax of structure (IV) alone, or in combination with the waxes of structure (II) and (III). In either case, 5-50% of the alkyl groups of waxes in the performance modifier of the invention are branched; in another embodiment, 10-40% of the alkyl groups are branched; in yet another embodiment, 10-30% of the alkyl groups are branched.

A second aspect of the present invention relates to the use of fatty bisamide waxes which are obtainable by the condensation of branched and/or linear fatty amines and alkylene diacids. The ratio of long-chain fatty amines to alkylene diacids is generally about 2 to 1.

The predominantly linear long-chain fatty amines preferably comprise C12-C22 fatty amines, saturated or unsaturated, optionally substituted. The branched long-chain fatty amines preferably comprise alkyl branched C12-C22 fatty amines, saturated or unsaturated, optionally substituted, that are at least 40%, in another embodiment at least 50%, in another embodiment 60-100% alkyl branched, in another embodiment methyl branched.

The alkylene diacids preferably comprise diacids of the structure

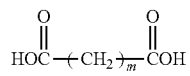

(V)

where m=0-4.

The resulting bisamide wax has the structure

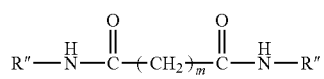

(VI)

where R" may be a long-chain alkyl group having from 12, in another embodiment from 18, to 24, in another embodiment from 18 to 22 carbon atoms, unsaturated or saturated, optionally substituted, or where R" may be a long-chain alkyl group having from 12, in another embodiment from 18, to 24, in another embodiment to 22 carbon atoms, unsaturated or saturated, optionally substituted, with alkyl branching, in another embodiment methyl branching, occurring on at least 40%, in another embodiment at least 50%, in another embodiment 60-100% of the R" groups, or where R" may be either a long-chain alkyl group having from 12, in another embodiment from 18, to 24, in another embodiment from 18 to 22 carbon atoms, unsaturated or saturated, optionally substituted, or a long-chain alkyl group having from 12, in another embodiment from 18, to 24, in another embodiment to 22 carbon atoms, unsaturated or saturated, optionally substituted, with alkyl branching, in another embodiment methyl branching, occurring on at least 40%, in another embodiment at least 50%, in another embodiment 60-100% of the R" groups, depending on the method of preparation. The performance modifier of the invention can comprise the bisamide wax of structure (VI) alone, or in combination with the waxes of structure (II) and (III), or in combination with the waxes of structure (II), (III) and (IV). In all the cases, 5-50% of the alkyl groups of the waxes in the performance modifier of the invention are branched; in another embodiment, 10-40% of the alkyl groups are branched; in yet another embodiment, 10-30% of the alkyl groups are branched.

In a third embodiment the fatty bisamide wax is a physical blend of two waxes, one with the linear R" structure, the other with the branched R" structure. The proportion of the second wax in the physical mixture is from 15%, in another embodiment from 20%, to 75%, in another embodiment from about 20% to 40%. 5-50% of the alkyl groups of the waxes are branched; in another embodiment, 10-40% of the alkyl groups are branched; in yet another embodiment, 10-30% of the alkyl groups are branched.

In a fourth embodiment the fatty bisamide wax is obtained by condensation of a mixture of linear and branched fatty amines of the types previously defined with alkylene diacids of the types previously defined. The proportion of branched fatty amine in the amine mixture is from 15%, in another embodiment from 20%, to 75%, in another embodiment from about 20% to 40%. 5-50% of the alkyl groups of the wax are branched; in another embodiment, 10-40% of the alkyl groups are branched; in yet another embodiment, 10-30% of the alkyl groups are branched.

Finally, the invention also provides for the use of the reaction products according to the invention as modifiers for asphalt cement. Thus, a third aspect of the invention is an asphalt binder composition comprising asphalt cement and a bisamide wax as defined above, preferably a compound with a mixture of formulas II and III, and most preferably a compound with a mixture of formulas II and III where the proportion of formula III is from 15%, in another embodiment from 20%, to 75%, in another embodiment from about 20% to 40%.

The amount of performance modifier comprising the bisamide wax mixture to be added to the asphalt binder composition is at least 0.5%, in another embodiment at least 1%, and in another embodiment at least 2% by weight, and in another embodiment at most 10%, in another embodiment at most 6%, and in another embodiment at most 4% by weight, based on the weight of the bitumen and/or asphalt cement. In typical embodiments, the asphalt binder composition of the invention comprises from about 0.5% to 10% by weight performance modifier based on the weight of the bitumen; in another embodiment from about 1.0% to 6% by weight performance modifier based on the weight of the bitumen present; and in still another embodiment from about 2.0% to 4% by weight performance modifier based on the weight of the bitumen present.

The ratio of said first fatty bisamide wax to said second fatty bisamide wax in said performance modifier is generally from about 8:1 to about 1:8; in another embodiment from about 6:1 to about 1:6; and in still another embodiment from about 4:1 to about 1:4.

In terms of percentages, the performance modifier of the invention generally comprises from about 15% to about 75% of said second fatty bisamide wax, the remainder being said first fatty bisamide wax; in another embodiment from about 20% to about 40% of said second fatty bisamide wax, the remainder being said first fatty bisamide wax.

The reaction products were prepared by known methods and tested in blends with asphalt cement. The parameters relevant for the processing and quality of the asphalt, viz. softening point (ring/ball, ASTM D36, EN 1427), needle penetration (ASTM D5, EN 1426), Fraass breaking point (EN 12593), performance grade (ASTM D6373), and wheel-tracking (EN 12697-22 procedure B) were examined.

It was surprisingly found that specific combinations of the bisamide waxes effect an improvement compared to the prior art.

The invention will now be illustrated by the following non-limiting examples.

Example 1

General Method of Preparation

The condensation of the acids component and the amine component can take place according to standard methods of organic chemistry which are well known from the art. In particular, it is desirous to use an over-stoichiometric excess of one of the compounds—usually the amine—and to separate the water of condensation continuously in order to shift the equilibrium of the reaction towards the condensation products. Subsequently, non-reacted starting material is separated from the final amide or polyamide for example by distillation at elevated temperatures and/or reduced pressure. Mixtures of linear/branched bisamides can be obtained both by the physical mixture of separately prepared linear bisamides and branched bisamides and by the mixture of linear and branched acids which are then condensed with an alkylene diamine (or equally the mixture of linear and branched amines which are then condensed with an alkylene diacid).

Additives and Starting Materials:
Sasobit®, a product of Sasol.
N,N'-Ethylene Bis(Stearamide) was purchased from Sigma-Aldrich.
Linear fatty acids: Industrene 9018 (from Chemtura, stearic acid), Pristerene 4911 (from Uniqenna, stearic acid).
Branched fatty acids: Emersol 3875 (from Emery Oleochemical, isostearic acid), Prifac 7990 (from Uniqenna, modified fatty acid), Century D1 (from Arizona Chemical, monomeric acid).
Amine: Ethylenediamine.
Physical Tests: Except where specified, all examples use physical blends.
Except where specified, in all examples the EBS was prepared from Industrene 9018; the branched amide was prepared from Emersol 3875.
Standard ASTM test methods were followed for performance grading of asphalt binders (D6373, D7175, D2872, D6521 and D6648) and for determining penetration depth and softening point (D5, D36). Breaking point Fraass test results were obtained with the European Standard method EN12593. Wheel track deformation results were obtained with the European Standard method EN 12697-22 procedure B.

Example 2

Certain combinations of linear and branched amides provided a performance boost in excess of that predicted by simple additive effects. The following graph shows the results on penetration and softening point of different compositions of blends of branched amide and linear amide (EBS). In all cases the total dosage was 2 wt % based on the weight of the asphalt cement.

In this example, the branched amide was prepared from Emersol 3875 isostearic acid and the linear amide was prepared from Industrene 9018 stearic acid, which contains >90% C18 fatty acid. The asphalt cement was a PG 64-22 performance graded binder from Alon.

The graph in FIG. 1 highlights clearly the synergy observed with the linear/branched amide blends, particularly with 25% branched amide. Dashed lines indicate the values for the unmodified asphalt cement. The lower dashed line represents the softening point and the upper dashed line represents the penetration depth.

Figure 2:
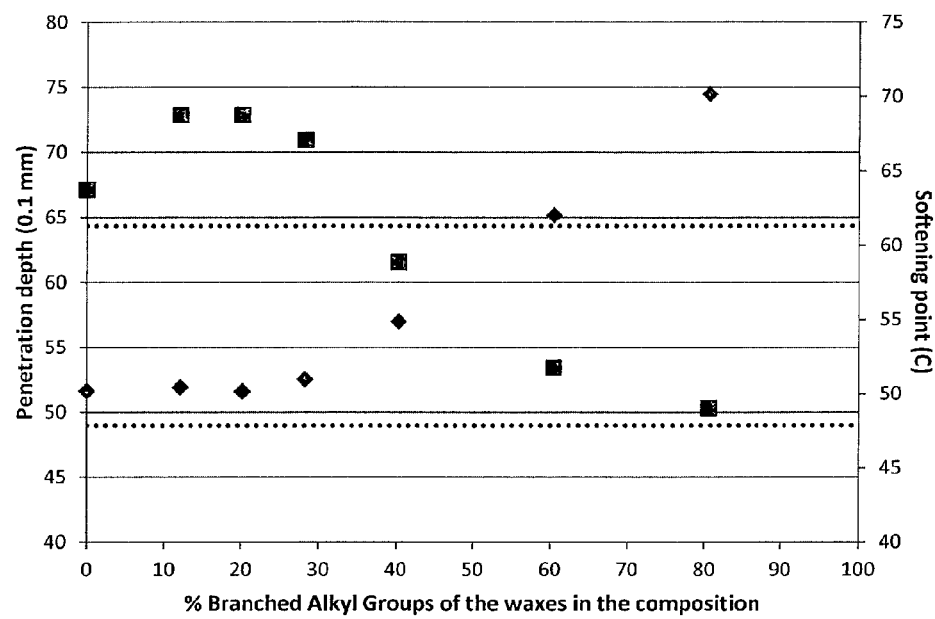
FIG. 2 illustrates the results on penetration and softening point of different compositions of blends of branched amides and linear amides, as a percentage of branched alkyl groups in the blends.

Alternatively, observing the total percentage of the alkyl groups of the bisamide waxes in the composition (taking into account the fact that the linear chain in the linear fatty bisamide wax is predominantly linear and that the branched chain in the branched fatty bisamide is not 100% branched), the result can be illustrated by the graph in FIG. 2.

Again, the graph highlights clearly the synergy observed with the linear/branched amide blends, particularly with 10-30% branched alkyl groups. Dashed lines indicate the values for the unmodified asphalt cement. The lower dashed line represents the softening point and the upper dashed line represents the penetration depth.

Example 3

Incorporation of linear waxes such as Fischer-Tropsch paraffin wax and linear amide waxes is known to raise the Fraass breaking point to warmer temperatures. In the table below, a comparison of Sasobit, EBS, and an EBS/branched amide mixture shows that incorporation of branched amide at 25% of the additive dosage improves the low temperature properties of asphalt cement over the other additives tested.

The asphalt cement is a 70/100 pen Shell bitumen modified where appropriate with 2 wt % additive.

| Additive | Amount (wt %) | Bitumen Pen (dmm) 25° C. | Bitumen Pen (dmm) 35° C. | Softening Point (° C.) | Fraass Average (° C.) |
|---|---|---|---|---|---|
| Reference 1 | N/A | 74 | 218 | 47 | −18 |
| Reference 2 | N/A | | | | |
| EBS/25% branched amide | 2% | 54 | 150 | 54 | −20 |
| EBS | 2% | 55 | 150 | 53 | −17 |
| Sasobit | 2% | 53 | 132 | 57 | −17 |

Fraass averages are the averages of 3-5 Fraass breaking point tests.

Example 4

Low temperature properties are also a part of SHRP's performance grading system. Low temperature failures obtained from the bending beam rheometer test are laid out in the table below. There is a clear trend in the low temperature data that correlates with the Fraass results in Example 3. FT wax (e.g. Sasobit) and linear EBS are both known in the field to have negative effects on low temperature performance.

The asphalt cement is a PG 64-22 performance graded Alon bitumen modified where appropriate with 2 wt % additive. Performance grading in-house determined that the actual binder grade was PG 64-16. Use of 25% branched amide in EBS yielded a binder of grade PG 76-16.

| | Amount (wt %) | Fail temperature Upper (° C.) | Fail temperature Lower* (° C.) | Span (° C.) | Pen (0.1 mm) | Softening point (° C.) | PG grade |
|---|---|---|---|---|---|---|---|
| unmodified | N/A | 65.5 | −21.2 | 86.7 | 61.3 | 47.8 | 64-16 |
| Sasobit | 2% | 73.4 | −20.0 | 93.4 | 40.1 | 72.0 | 70-16 |
| EBS | 2% | 83.2 | −20.6 | 103.8 | 51.7 | 63.8 | 82-16 |
| EBS/25% branched amide | 2% | 79.1 | −21.2 | 100.3 | 51.6 | 68.8 | 76-16 |
| 100% branched amide | 2% | 63.3 | −22.5 | 85.8 | 74.5 | 49.0 | 58-22 |

*calculated from a graph of BBR stiffness and critical fail temperature based on laboratory data Example 5

A wheel tracking test assesses the ability of asphalt modifiers to suppress rut formation. All three additives tested showed excellent performance in reducing rut formation compared to the unmodified reference sample with the same mix design.

Use of branched EBS at an appropriate level improves resistance to rutting while maintaining low temperature properties as seen in Example 3. The blended EBS also showed a good reduction in force needed for compaction indicating suitability for use as a warm mix asphalt additive or as a compaction aid for hot mix asphalt.

The mix design is an 11 mm asphaltic concrete with 6 wt % 70/100 pen Shell bitumen with 2 wt % additive. Slabs were compacted to 10% air voids at 130° C. Results are the average of two slabs, with the exception of Reference 1 which is for a single slab. Results were obtained according to European Standard method EN 12697-22 procedure B.

| Sample | Amount (wt %) | Compactibility force (kN) | Wheel-tracking slope (mm/1000 cycles) | Rut depth (mm) | prop. Rut depth (%) |
|---|---|---|---|---|---|
| Reference 1 | N/A | n.m. | 0.30 | 6.5 | 9.6 |
| Reference 2 | N/A | 7.5 | 0.36 | 6.7 | 9.9 |
| EBS/25% branched amide | 2% | 6.7 | 0.08 | 3.2 | 4.7 |
| EBS | 2% | 6.3 | 0.11 | 3.6 | 5.2 |
| Sasobit | 2% | 6.5 | 0.11 | 3.4 | 5.0 |

Example 6

Multiple strain creep recover (MSCR) is a test of bitumen elasticity, usually used to test for the presence of elastomeric performance modifiers such as SBS or SBR. Non-recoverable creep compliance (Jnr), the figure of merit for MSCR, has been correlated with rutting and so was included in the asphalt binder testing. Decreases in Jnr are observed for the linear and blended EBS, as well as Sasobit, despite the complete lack of elastomer in any of these additives. Reduction in Jnr is indicative of rutting resistance.

| | | MSCR results | | | |
|---|---|---|---|---|---|
| | | % recovery | | Jnr | |
| | dose | 0.1 kPa | 3.2 kPa | 0.1 kPa | 3.2 kPa |
| unmodified | N/A | 0.04 | 0.07 | 3.42 | 3.49 |
| Sasobit | 2% | 43.6 | 3.46 | 0.66 | 2.13 |
| EBS | 2% | 93.3 | 6.98 | 0.02 | 1.67 |

-continued

| | | MSCR results | | | |
|---|---|---|---|---|---|
| | | % recovery | | Jnr | |
| | dose | 0.1 kPa | 3.2 kPa | 0.1 kPa | 3.2 kPa |
| EBS/25% branched amide | 2% | 93.3 | 4.43 | 0.03 | 2.10 |
| branched amide | 2% | 6.36 | −0.15 | 4.09 | 4.95 |

Example 7

Blended samples were prepared by condensing ethylenediamine (EDA) with a blend of linear and branched fatty acids. This resulted in a mixture of all-linear, all-branched, and branched-linear amides. Physical mixtures, as described in previous examples, resulted in mixtures of all-linear and all-branched amides, with no branched-linear amides. The blended acids have lower softening points and higher penetration values than the blended amides of the same composition, as well as decreased upper failure temperatures. Some of this effect is from the difference in linear acid component: the original linear acid was not available in linear amide form, and so a different linear amide was used, with a different C16/C18 ratio.

With both the physical blends of the linear and branched amide waxes and the amide waxes produced from a blend of linear and branched acids a decrease in penetration and increase in softening point is seen over the unmodified asphalt cement, and similarly an increase in upper fail temperature. There is no difference in low temperature failure for the different blending methods.

The asphalt cement is a PG 64-22 performance graded Alon bitumen from 2010, modified where appropriate with 2 wt % additive. The linear fatty acid was Pristerene 4911; the branched fatty acid was Prifac 7990. N,N'-Ethylene Bis (Stearamide) from Sigma-Aldrich was the source of the EBS in the amide blend. Branched amide prepared from Prifac 7990 was the branched amide in the amide blend. Pristerene 4911 was 52% C18, the EBS from Sigma-Aldrich was 69% C18.

Penetration and softening point results:

|  |  |  | Pen, 0.1 mm | | Softening point, ° C. | |
| --- | --- | --- | --- | --- | --- | --- |
| Additive | Additive dose | Percent branched | acid blend | amide blend | acid blend | amide blend |
| unmodified | N/A | N/A | 51.6 | | 48.9 | |
| EBS | 2% | 0 | n.m. | 42.2 | n.m. | 61.9 |
| EBS/branched amide | 2% | 25 | 38.2 | 38.1 | 62.6 | 65.2 |
| EBS/branched amide | 2% | 50 | 49.3 | 42.0 | 56.9 | 60.5 |
| branched amide | 2% | 100 | 63.3 | | 49.6 | |

Performance grading results (DSR, BBR):

|  |  |  | Upper fail temp, ° C. | | Lower fail temp*, ° C. | |
| --- | --- | --- | --- | --- | --- | --- |
| Additive | Additive dose | Percent branched | acid blend | amide blend | acid blend | amide blend |
| unmodified | N/A | N/A | 66.2 | | −23.0 | |
| EBS | 2% | 0 | n.m. | 77.3 | n.m. | −21.8 |
| EBS/branched amide | 2% | 25 | 71.9 | 74.6 | −22.7 | −22.5 |
| EBS/branched amide | 2% | 50 | 69.9 | 72.3 | −22.7 | −22.9 |
| branched amide | 2% | 100 | 64.4 | | −23.6 | |

*calculated from a graph of BBR stiffness and critical fail temperature based on laboratory data Evaluation:

Use of linear EBS or FT wax to improve rutting and decrease production viscosity has a negative effect on low temperature properties. Incorporation of branched EBS-type amide improves the low temperature properties while also improving rutting characteristics and production viscosities. Surprisingly, certain combinations of linear and branched amides provided a performance boost in excess of that predicted by simple additive effects. Thus, it was possible to re-grade a PG64-16 binder to PG76-16 by using amides based largely on renewable materials and without the use of synthetic waxes or polymer modifiers. It was also found that certain combinations of linear and branched fatty amides provided increases in the softening point and decreases in the penetration depth of asphalt binder in excess of that predicted by simple additive effects.

What is claimed is:

1. An asphalt binder composition comprising bitumen and an effective amount of a performance modifier, wherein said performance modifier comprises a blend of a first fatty bisamide wax of the structure

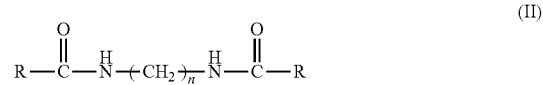

(II)

where each R is independently selected from a saturated or unsaturated, optionally substituted predominantly linear alkyl group having from 11 to 23 carbon atoms, and n is an integer of 2 to 6, and the second fatty bisamide wax of the structure

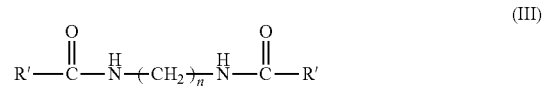

(III)

where R' is a unsaturated or saturated, optionally substituted long-chain, branched alkyl group having from 11 to 23 carbon atoms, and n is an integer of 2 to 6, wherein 5-50% of the alkyl groups of the bisamide waxes are branched.

2. The composition of claim 1 wherein each R group is independently selected from a saturated or unsaturated, optionally substituted long-chain alkyl group having from 17 to 23 carbon atoms.

3. The composition of claim 1 wherein each R' group is independently selected from a saturated or unsaturated, optionally substituted long-chain, branched alkyl group having from 17 to 23 carbon atoms.

4. The composition of claim 1 wherein the alkyl branching in each R' is methyl branching, and said methyl branching occurs on at least 40% of the R' groups.

5. The composition of claim 1 wherein the ratio of said first fatty bisamide wax to said second fatty bisamide wax is from about 8:1 to about 1:8.

6. The composition of claim 1 wherein said performance modifier additionally comprises a mixed bisamide wax of the structure

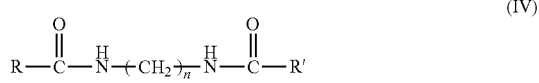

(IV)

where R is a long-chain, unsaturated or saturated, optionally substituted predominantly linear alkyl group having from 11 to 23 carbon atoms, and where R' is a long-chain, unsaturated or saturated, optionally substituted alkyl group having from 11 to 23 carbon atoms with alkyl branching, and where n is an integer of 2 to 6, wherein 5-50% of the alkyl groups of the bisamide waxes in the composition are branched.

7. The composition of claim 6 wherein the alkyl branching in R' of structure (IV) is methyl branching, and said methyl branching occurs on at least 40% of the R' groups.

8. The composition of claim 1 wherein said performance modifier additionally comprises a bisamide wax of the structure

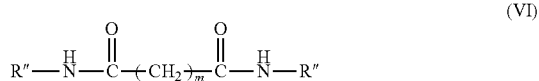

(VI)

wherein each R" is independently selected from a long-chain, unsaturated or saturated, optionally substituted alkyl group having from 12 to 24 carbon atoms, optionally alkyl branched, and m is 0 or an integer of 1 to 4, wherein 5-50% of the alkyl groups of the bisamide waxes in the composition are branched.

9. The composition of claim 1 which comprises from about 0.5% to 10% by weight performance modifier based on the weight of the bitumen.

10. The composition of claim 9 wherein the performance modifier comprises from about 15% to about 75% of said second fatty bisamide wax, the remainder being said first fatty bisamide wax.

11. An asphalt binder composition comprising bitumen and from about 0.5% to 10% by weight performance modifier based on the weight of the bitumen, wherein said performance modifier comprises a mixed bisamide wax of the structure

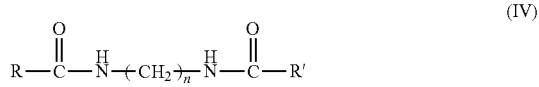

(IV)

wherein R is a long-chain, unsaturated or saturated, optionally substituted predominantly linear alkyl group having from 11 to 23 carbon atoms, and where R' is a long-chain, unsaturated or saturated, optionally substituted alkyl group having from 11 to 23 carbon atoms with alkyl branching, and n is an integer of 2 to 6, wherein 5-50% of the alkyl groups of the bisamide wax in the composition are branched.

12. An asphalt paving composition comprising aggregate and from about 2% to 20% of the asphalt binder composition of claim 1, and wherein said paving composition is a hot mix, warm mix or cold mix paving composition.

13. An asphalt paving composition comprising aggregate and from about 2% to 20% of the asphalt binder composition of claim 6, and wherein said paving composition is a hot mix, warm mix or cold mix paving composition.

14. An asphalt paving composition comprising aggregate and from about 2% to 20% of the asphalt binder composition of claim 8, and wherein said paving composition is a hot mix, warm mix or cold mix paving composition.

15. An asphalt paving composition comprising aggregate and from about 2% to 20% of the asphalt binder composition of claim 11, and wherein said paving composition is a hot mix, warm mix or cold mix paving composition.

16. An asphalt emulsion comprising 20-80% by weight of the asphalt binder composition of claim 1.

17. An asphalt emulsion comprising 20-80% by weight of the asphalt binder composition of claim 6.

18. An asphalt emulsion comprising 20-80% by weight of the asphalt binder composition of claim 8.

19. A mastic asphalt composition comprising aggregate and the asphalt binder composition of claim 1.

20. A method for reducing the tracking of tack coats, primes, and fog seals in asphalt compositions, said method comprising adding to said composition an effective amount of an asphalt binder composition comprising bitumen and an effective amount of a performance modifier, wherein said performance modifier comprises a blend of a first fatty bisamide wax of the structure

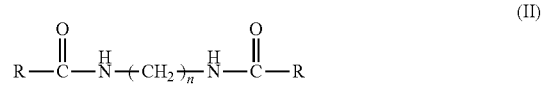

(II)

where each R is independently selected from a saturated or unsaturated, optionally substituted predominantly linear alkyl group having from 11 to 23 carbon atoms, and n is an integer of 2 to 6, and a second fatty bisamide wax of the structure

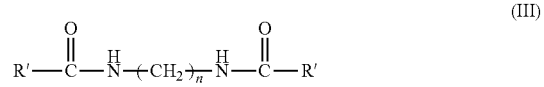

(III)

where R' is a unsaturated or saturated, optionally substituted long-chain, branched alkyl group having from 11 to 23 carbon atoms, and n is an integer of 2 to 6; and/or a mixed bisamide wax of the structure

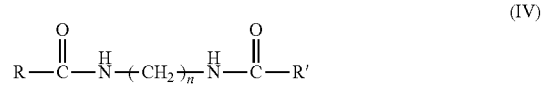

(IV)

wherein R is a long-chain, unsaturated or saturated, optionally substituted predominantly linear alkyl group having from 11 to 23 carbon atoms, and where R' is a long-chain, unsaturated or saturated, optionally substituted alkyl group having from 11 to 23 carbon atoms with alkyl branching, and n is an integer of 2 to 6; and/or a bisamide wax of the structure
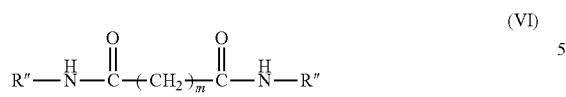
(VI)
wherein each R″ is independently selected from a long-chain, unsaturated or saturated, optionally substituted alkyl group having from 12 to 24 carbon atoms, optionally alkyl branched, and m is 0 or an integer of 1 to 4, wherein 5-50% of the alkyl groups of the bisamide waxes in the composition are branched.
* * * * *